United States Patent [19]
Park

[11] Patent Number: 6,091,212
[45] Date of Patent: Jul. 18, 2000

[54] CIRCUIT FOR ADJUSTING A HORIZONTAL CENTER OF A RASTER FOR A MONITOR

[75] Inventor: Tae-Gil Park, Kyunggi-Do, Rep. of Korea

[73] Assignee: Daewoo Electronics Co., Ltd., Seoul, Rep. of Korea

[21] Appl. No.: 09/084,972

[22] Filed: May 28, 1998

[30] Foreign Application Priority Data

Jun. 26, 1997 [KR] Rep. of Korea .................. 97-27813

[51] Int. Cl.[7] .............. G09G 1/04; H01J 29/56; H01J 29/70
[52] U.S. Cl. ............... 315/370; 315/403; 315/405
[58] Field of Search ............... 315/370, 411, 315/403, 405

[56] References Cited

U.S. PATENT DOCUMENTS 4,954,757 9/1990 Berwin .................. 315/403

FOREIGN PATENT DOCUMENTS 2222058  2/1990  United Kingdom .
2303280  2/1997  United Kingdom .

Primary Examiner—Seungsook Ham
Assistant Examiner—John Patti
Attorney, Agent, or Firm—Smith, Gambrell & Russell, LLP

[57] ABSTRACT

Disclosed is a circuit for adjusting a horizontal center of a raster displayed on a monitor CRT, which includes a current generating circuit which can control an amount of a direct current flowing through a horizontal deflection yoke of the monitor based on a control voltage, a first voltage, and a second voltage. A control part generates the control voltage in response to a center adjustment signal. A voltage generating circuit generates the first and second voltages, respectively. The first voltage has a higher potential than that of a $B^+$ voltage which is applied to the horizontal deflection yoke, and the second voltage has a lower potential than that of the $B^+$ voltage. The current generating circuit either generates a first current flowing into the horizontal deflection yoke to increase the direct current or a second current flowing out therefrom to decrease the direct current, such that the horizontal center of the raster is controlled.

8 Claims, 3 Drawing Sheets

CIRCUIT FOR ADJUSTING A HORIZONTAL CENTER OF A RASTER FOR A MONITOR

BACKGROUND OF THE INVENTION

1. Field of the Invention

This invention is related to a monitor, more particularly to a circuit for adjusting a horizontal center of a raster which is developed on a screen of a monitor.

2. Description of the Prior Art

Generally, when manufacturing monitors, there is need for adjusting their deflection circuits to allow the horizontal center of a raster developed on the monitor screen to be aligned with that of the monitor screen before being on the market. Therefore, a raster centering circuit is provided to a deflection circuit of each monitor to allow workers to easily accomplish the adjustment of the raster centering.

FIG. 1 is a view for showing a horizontal deflection circuit that includes a conventional centering circuit for adjusting the horizontal center of a raster.

Referring to FIG. 1, the horizontal deflection circuit includes a horizontal driving circuit 110, a horizontal output circuit 120, a linear correction circuit 130, and a horizontal centering circuit 140.

The horizontal driving circuit 110 generates horizontal driving pulses according to a horizontal frequency signal developed by a horizontal oscillator 100, and outputs the horizontal driving pulses to the horizontal output circuit 120.

The horizontal driving circuit 110 includes a horizontal driving transistor Q1 and a horizontal driving transformer (hereinafter, referred to as HDT), as shown in FIG.1. the horizontal driving transistor Q1 is turned on/off in response to the horizontal frequency signal being outputed from the horizontal oscillator 110 to thereby drive a primary coil of the HDT, such that the horizontal driving pulses are generated at a secondary coil of the HDT.

The horizontal output circuit 120 drives the horizontal deflection yoke Hy according to the horizontal driving pulses being outputted from the horizontal driving circuit 110.

The horizontal output circuit 120 includes an output transistor Q2, a damper diode D2, and a resonant capacitor C3.

The base of output transistor Q2 is electrically connected with the secondary coil of the HDT via a resistor R5. The output transistor Q2 is turned on/off by the horizontal driving pulses from the HDT to thereby drive the horizontal deflection yoke Hy. As the output transistor Q2 is turned on/off, a sawtooth current, that is, a horizonal deflection current, which is developed by a contribution of the damper diode D2 and a resonant capacitor C3, flows through the horizontal deflection yoke Hy, as shown in FIG. 2. And, as well known in the art, the horizontal deflection current is corrected by the linear correction circuit 130 and a S-correction capacitor Cs.

Further, a position of a horizontal center of a raster developed on a monitor screen is determined by an amount of the average or direct current, that is, a central level of a ramp of the horizontal deflection current flowing through the horizontal deflection yoke Hy. Therefore, for aligning the horizontal center of the raster with the center of the monitor screen, the DC current flowing through the horizontal deflection yoke Hy must be adjusted.

As shown in FIG. 1, the horizontal centering circuit 140 is connected to a connection node A to which the linear correction circuit 130 and the S correction capacitor Cs are connected with each other. The horizontal centering circuit 140 includes a first switch 141 and a second switch 142, each of which is used to control the amount of a DC current flowing through the horizontal deflection yoke Hy. One terminal of each of the first and second switches 141 and 142 is connected to the connection node A, and each of their other terminals is electrically connected with a $B^+$ terminal via a first diode D3, a second diode D4, a variable resistor R8, and a choke coil 143 when both the first and second switches 141 and 142 are turned on. When the first switch 141 is turned on and the second switch 142 is turned off, the cathode of the first diode D3 is electrically connected with the connection node A, thereby preventing a current from flowing from the $B^+$ terminal into the horizontal deflection yoke Hy via the variable resistor R8 and the choke coil 143. To the contrary, when the second switch 142 is turned on and the first switch 141 is turned off, the anode of the second diode D4 is electrically connected with the connection node A, thereby preventing the horizontal deflection current from flowing into the $B^+$ terminal via the variable resistor R8 and the choke coil 143.

Therefore, achievement results to align the horizontal center of the raster to that of the monitor screen by varying the resistance value of the variable resistor R8 to thereby vary the intensity of DC current flowing through the horizontal deflection yoke Hy after selectively either the first switch 141 or the second switch 142 is turned on.

However, it is difficult and time consuming to precisely align a horizontal center of a raster with the center of a monitor screen by manually adjusting a resistance value of the variable resistor R8. Therefore, it is impossible to improve the productivity of monitor manufacturing with the prior art.

For the foregoing reasons, there is need for providing a circuit which can efficiently adjust a horizontal center of a monitor raster.

SUMMARY OF THE INVENTION

It is one object of the present invention to provide a circuit which can align the horizontal center of a raster developed on a monitor screen with that of the monitor screen.

It is another object of the present invention to provide a circuit which can easily adjust a direct current flowing through a horizontal deflection yoke of a monitor.

In order to achieve the object, a circuit according to the present invention includes first means for generating a first voltage and a second voltage, the first voltage having a higher potential than that of a $B^+$ voltage which is applied to a horizontal deflection yoke of the monitor, the second voltage having a lower potential than that of the $B^+$ voltage; second means for generating a control voltage in response to a center adjustment signal which is provided from an exterior; and third means for controlling an amount of a direct current flowing through the horizontal deflection yoke based on a voltage difference between the control voltage and each of both the first voltage and the second voltage.

According to the present invention, the circuit makes a moniter generate a raster, the horizontal center of which is aligned with the center of the monitor screen.

BRIEF DESCRIPTION OF THE DRAWINGS

The foregoing and other objects, aspects and advantages will be better understood from the following detailed description of preferred embodiments of the invention with reference to the drawings, in which.

DESCRIPTION OF THE PREFERRED EMBODIMENT

Preferred embodiments of the present invention will be illustrated below with reference to the accompanying drawings.

Figure 3:
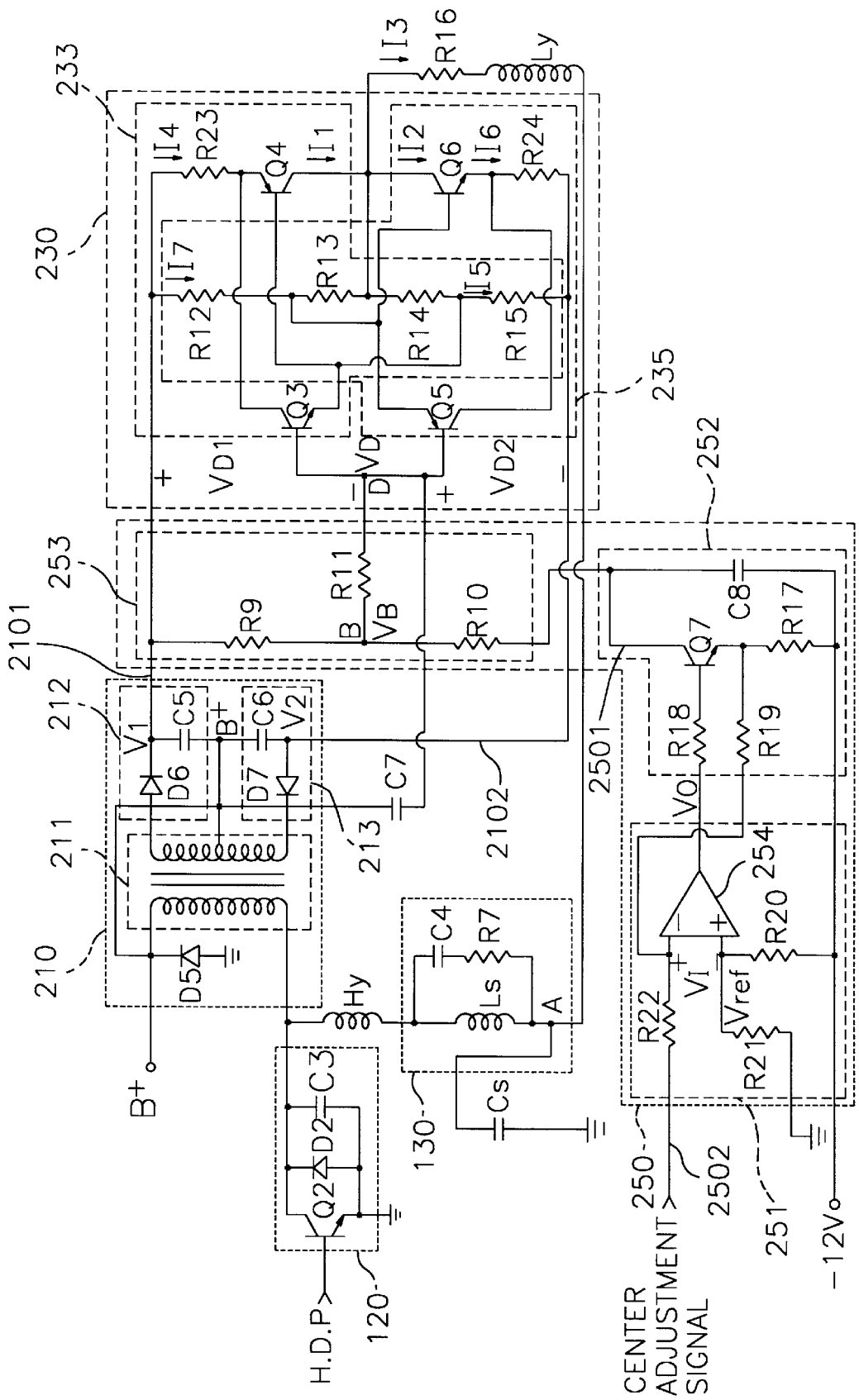
FIG. 3 is a view for showing a circuit for adjusting the horizontal center of a raster for a monitor according to one embodiment of the present invention.

FIG. 3 is a view for showing a circuit for adjusting the horizontal center of a raster for a monitor according to one embodiment of the present invention.

Referring to FIG. 3, the circuit according to one embodiment of the present invention includes a voltage generation part 210, a current output part 230, and a control part 250.

The voltage generation part 210 generates a first voltage $V_1$ and a second voltage $V_2$. The voltage generation part 210 provides the first and second voltages $V_1$ and $V_2$ to the current output part 230, respectively. The first voltage $V_1$ has a higher potential than that of a B+ which is applied to a horizontal deflection yoke Hy, and the second voltage $V_2$ has a lower potential than that of the B+.

The voltage generation part 210 includes a transformer 211, a first rectifier 212, and a second rectifier 213 for generating the first and second voltages $V_1$ and $V_2$, respectively. The transformer 211 includes a primary coil and a secondary coil. The primary coil is driven with the horizontal deflection yoke Hy. The secondary coil generates an induced voltage as the primary coil is driven with a horizontal deflection yoke Hy by the output transistor Q2 of the horizontal output circuit 120.

Each of the first and second rectifiers 212 and 213 half-rectifies the induced voltage generated from the transformer 211. The first rectifier 212 rectifies a positive component of the induced voltage, and integrates the positive component to thereby generate the first voltage having a higher potential than that of the B+. To the contrary, the second rectifier 213 rectifies a negative component of the induced voltage, and integrates the negative component to thereby generate the second voltage having a lower potential than that of the B+.

One terminal of the primary coil of the transformer 211 is electrically connected with the B+, and the other terminal of the primary coil is connected with the collector of the output transistor Q2 of the horizontal output circuit 120, such that the primary coil is driven by the output transistor Q2. Also, the secondary coil of the transformer 211 is electrically connected with the B+.

The first rectifier 212 includes a first diode D6 and a first capacitor C5 for half-rectifying the induced voltage from the secondary coil of the transformer 211. The anode of the first diode D6 is connected with one terminal of the second coil of the transformer 211, and the cathode of the first diode D6 is connected with one terminal of the first capacitor C5. The other terminal of the first capacitor C5 is connected with the B+. The first diode D6 half-rectifies the induced voltage induced at the secondary coil of the transformer 211 to thereby generate a positive half-rectified voltage component signal. The first capacitor C5 integrates the positive half-rectified voltage component signal from the first diode D6 to thereby generate a DC voltage as the first voltage. Therefore, the first diode and capacitor C5 generate the first voltage having a higher potential than that of B+.

The second rectifier 213 includes a second diode D7 and a second capacitor C6 for half-rectifying the induced voltage from the secondary coil of the transformer 211. The cathode of the second diode D7 is connected with one terminal of the second coil of the transformer 211, the anode of the second diode D7 is connected with one terminal of the second capacitor C6. The other terminal of the second capacitor C6 is connected with the B+. The second diode D7 half-rectifies the induced voltage induced at the secondary coil of the transformer 211 to thereby generate a negative half-rectified voltage component signal. The second capacitor C5 integrates the negative half-rectified voltage component signal from the second diode D7 to thereby generate a DC voltage as the second voltage. Therefore, the second diode and capacitor D7 and C6 generate the second voltage having a lower potential than that of B+.

The current output part 230 controls an intensity of the direct current flowing through the horizontal deflection yoke Hy in response to a control voltage $V_B$ related with the first and second voltages $V_1$ and $V_2$, which is provided from the control part 250 illustrated below.

The current output part 230 includes a first output circuit 233 and a second output circuit 235 in order to control the intensity of the direct current flowing through the horizontal deflection yoke Hy in response to the control voltage 2501. The first output circuit 233 generates a first output current $I_1$ according to the control voltage and the second output circuit 235 outputs a second output current $I_2$ according to the control voltage. The first and second output circuits 233 and 235 are complimentarily operated with respect to the control voltage, such that the direct current of the horizontal deflection yoke Hy is increased or decreased by the first and second output circuit 233 and 235. That is, when the first output current $I_1$ of the first output circuit 233 is increased, the second output current $I_2$ is decreased, and vice versa. Also, the first and second output circuits 233 and 235 have a common input node D which is electrically connected with an output terminal of the control part 250.

The first output circuit 233 includes a first resistor R23, second through fifth resistors R12 through R15, a first NPN transistor Q3, and a first PNP transistor Q4 in order to generate the first output current $I_1$.

The second through fifth resistors R12 through R15 are connected in series with one another between both the first and second output terminals 2101 and 2102 of the first and second voltages $V_1$ and $V_2$. One terminal of the first resistor R23 is connected with the first output terminal 2101 of the first voltage $V_1$, and the other terminal is connected with the collector of the first NPN transistor Q3 and the emitter of the first PNP transistor Q4, respectively.

Further, the base of the first PNP transistor Q4 and the emitter of the first NPN transistor Q3 are connected with a connection node of connecting the fourth and fifth resistors R14 and R15 with each other. The collector of the first PNP transistor Q4 is electrically connected with the horizontal deflection yoke Hy via a sixth resistor R16 and a choke coil Cy. And, the base of the NPN transistor Q3 is connected with the common input node D. Therefore, the first current $I_1$ of the first output circuit 233 is a collector current $I_1$ of the first PNP transistor Q4.

The second output circuit 235 is a complimentary equivalent of the first output circuit 233 to be operated complimentarily for the control voltage $V_B$. The second output circuit 235 preferably includes the second through fifth resistors R12 through R15, a second PNP transistor Q5, a second NPN transistor Q6, and a seventh resistor R24.

The base of the second NPN transistor Q6 and the emitter of the second PNP transistor Q5 are connected with a connection node which is formed by connecting the second and third resistors R12 and R13 with each other. The collector of the second PNP transistor Q5 and the emitter of the second NPN transistor Q6 which are connected with each other are connected with one terminal of the seventh resistor R24. The other terminal of the seventh resistor R24 is connected with the second output terminal 2102 through which the second voltage $V_2$ is outputted from the voltage generation circuit 210.

And, the second output circuit 235 outputs the second current $I_2$ through the collector of the second NPN transistor Q6 which is electrically connected with the horizontal deflection yoke Hy via the sixth resistor R16 and the choke coil CY.

The control part 250 generates the control voltage $V_B$ in response to a center adjustment signal 2502 inputted from an exterior. The control part 250 includes an amplifying circuit 251, a current generation circuit 252, and a voltage generation circuit 253.

The amplifying circuit 251 amplifies a center adjustment signal 2502 and outputs an amplified signal to the current generation circuit 252.

The amplifying circuit 251 includes an amplifier 254. The amplifier 254 preferably is an operation amplifier 254 (hereinafter, referred to as Op-Amp). The center adjustment signal 2502 is inputted to the inverting terminal of the Op-Amp 254 through an eighth resistor R22, and a reference voltage Vref is inputted to the noninverting of the Op-Amp 254. The reference voltage Vref is generated across a ninth resistor R21 which is connected with an exterior voltage source(−12 voltage) through a tenth resistor R20.

The current generation circuit 252 includes a third NPN transistor Q7 in order to generate a current corresponding to an output voltage which is provided from the Op-Amp 254. The base of the third NPN transistor Q7 is connected with the output terminal of the Op-Amp 254 through the 11th resistor R18. The emitter of the third NPN transistor Q7 is connected with one terminal of the 12th resistor R17, and the other terminal of the 12th resistor R17 is connected to the exterior voltage source, such that the third NPN transistor Q7 is biased by the exterior voltage source. And, the current generated at the collector of the third NPN transistor Q3 according to the output voltage of the Op-Amp 254 is outputted to the voltage generation circuit 253.

Further, the emitter of the third NPN transistor Q7 is connected with the inverting terminal of the Op-Amp 254 by a 13th resistor 19, such that a voltage of the emitter of the third NPN transistor Q7 feedbacks to the inverting terminal of the Op-Amp 254.

The voltage generation circuit 253 generates the control voltage $V_B$ in response to the current being inputted from the current generation circuit 253, and outputs the control voltage $V_B$ to the current generation part 230.

The voltage generation circuit 253 includes the 14th resistor R9 and the 15th resistor R10. One terminal of the 14th resistor R9 is connected with the first output terminal 2101 of the first voltage $V_1$, and the other terminal of the 14th resistor R9 is connected to a node B. One terminal of the 15th resistor R10 is connected with the collector of the third NPN transistor Q7, and the other terminal of the 15th resistor R10 is connected to the node B. Therefore, the voltage generation circuit 253 generates the voltage of the node B as the control voltage $V_B$ in response to the current of collector of the third NPN transistor Q7, and outputs the control voltage $V_B$ to each base of both the second PNP transistor Q5 and the first NPN transistor Q3 through the 16th resistor R11, one terminal of which is connected with the node B and the other terminal of which is connected with the node D.

The operation of the circuit according to the present invention will be described in detail below with reference to FIGS. 2 and 3.

Figure 1:
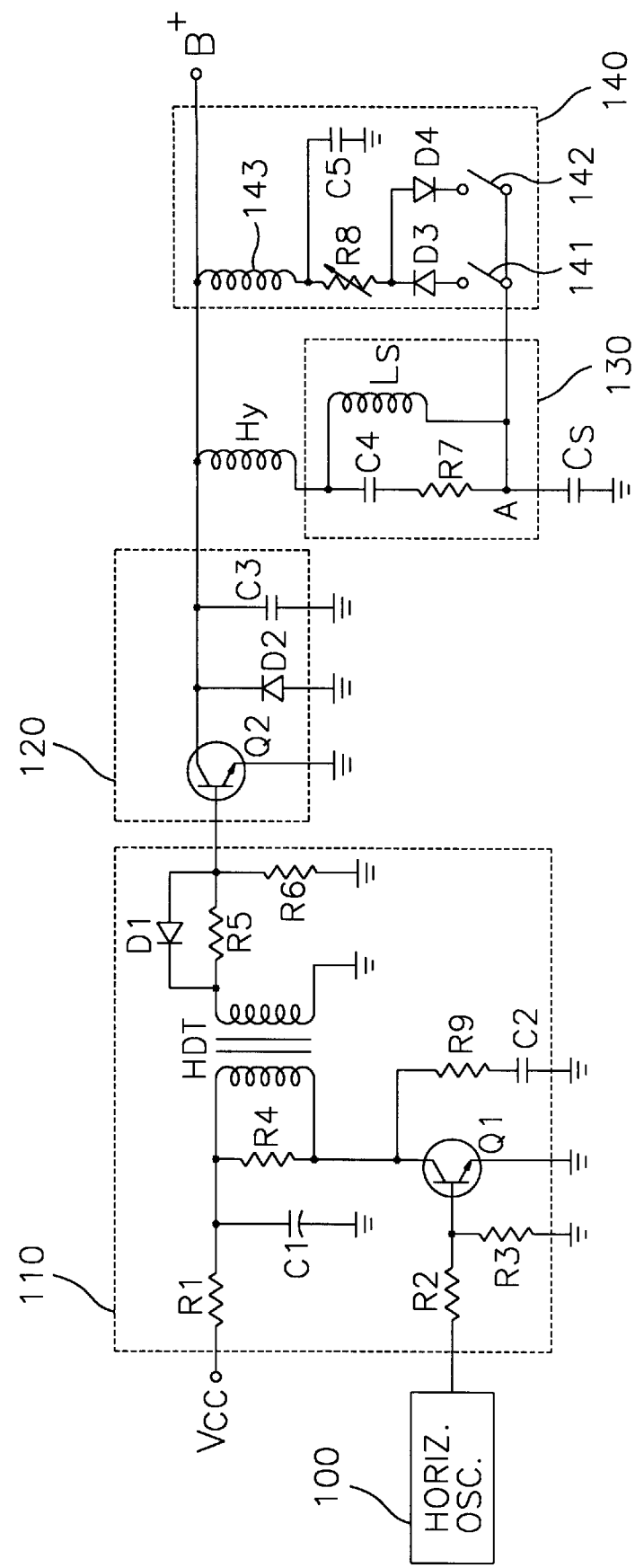
FIG. 1 is a view for showing a horizontal deflection circuit that includes a prior art centering circuit for adjusting the horizontal center of a raster.
Figure 2:
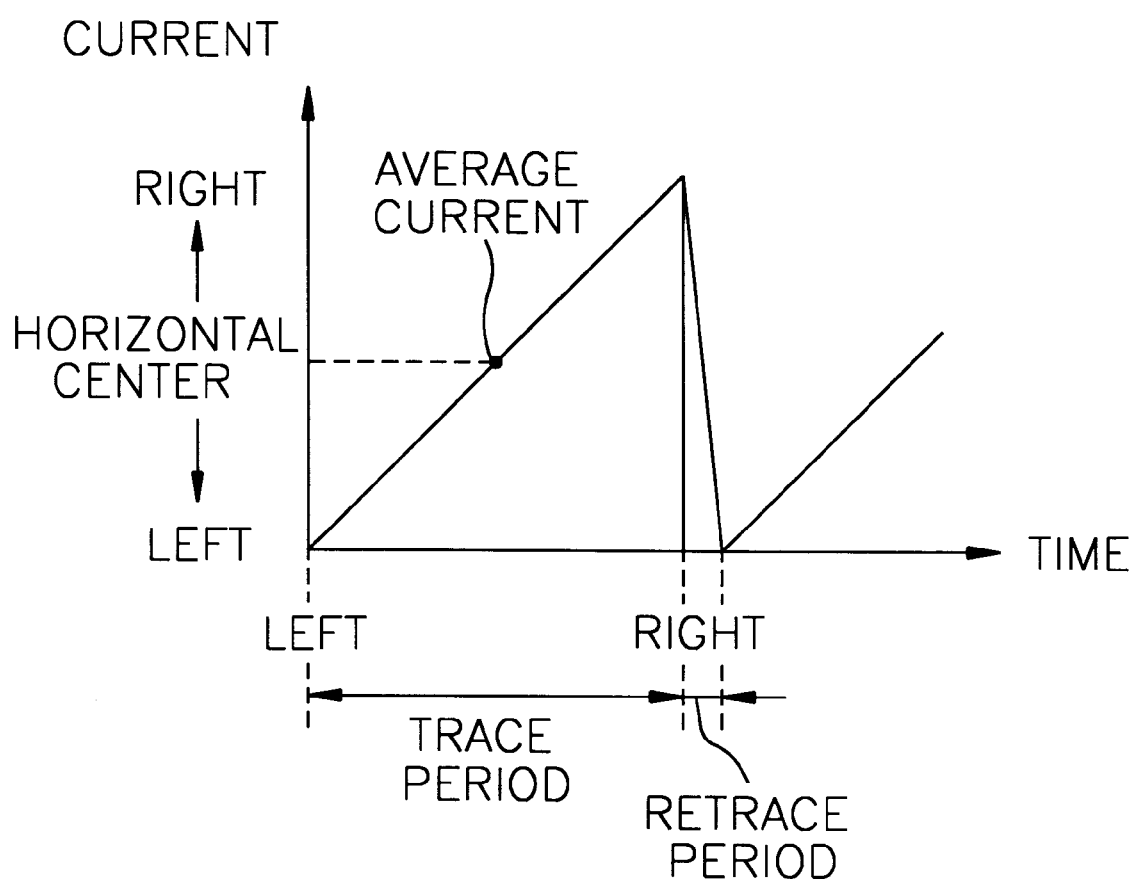
FIG. 2 is a view for showing a sawtooth current flowing through a horizontal deflection yoke of a monitor.

As illustrated above, as the horizontal driving pulses are inputted to the output transistor Q2 of the horizontal output circuit 120, by the switching operation of the output transistor Q2, a sawtooth current, as shown in FIG. 2, flows through the horizontal deflection yoke Hy, such that a raster is developed on the screen of the monitor(not shown in FIG.3). At this time, the horizonal center of the raster is determined by the amount of direct current flowing through the horizontal deflection yoke Hy.

When the DC current flowing through the horizontal deflection yoke Hy is decreased, the horizontal center of the raster moves left on the screen in proportion to the degree of variation of the amount of the DC current. To the contrary, when the DC current is increased, the horizontal center of the raster moves right.

In FIG. 3, the intensity of the DC current flowing through the horizontal deflection yoke Hy is increased when the current generation part 230 provides a current to the node A to which the horizontal deflection yoke Hy is electrically connected through the sixth resistor R16 and the choke coil CY.

When the DC current of the horizontal deflection yoke Hy is increased, the current generation part 230 outputs the first current $I_1$ which is generated from the first output circuit 233 thereof. And, since the second output circuit 235 is complimentarily operated with the first output circuit 233, the second current $I_2$ being developed from the second output circuit 235 is decreased when the first current $I_1$ is increased. Therefore, a current $I_3$ flowing through the sixth resistor R16 and the choke coil Ly is increased, such that DC current of the horizontal deflection yoke Hy is increased.

For increasing the first current $I_1$, the control voltage which is provided from the control part 250 to the current output part 230 must be decreased. That is, since the first current $I_1$ is the collector current of the first PNP transistor Q4, assuming that base currents of the first NPN and PNP transistors are zero, the first current II can be expressed as follows:

$$I_1 = I_4 - I_5 \tag{1}$$

where $I_4$ denotes a current flowing through the first resistor R23, and $I_5$ denotes a current flowing through the fifth resistor R15.

And, in equation (1), when $I_5$ has a constant value, the first current $I_1$ is determined by the current $I_4$ flowing through the first resistor 23. Also, since a base-emitter voltage drop of the first NPN Q3 is compensated by a base-emitter voltage drop of the first PNP Q4, assuming that the base currents of the first NPN and PNP transistors Q3 and Q4 are zero, the voltage across the first resistor R23 is equal to the voltage difference between the first voltage $V_1$ and the control voltage $V_B$. Therefore, the current $I_4$ can be written as follows:

$$I_4 = \frac{V_{D1}}{R23} \quad (2)$$

where $V_{D1}=V_1-V_D$.

Therefore, as shown in equations (1) and (2), the first current $I_1$ is in proportion to the difference voltage $V_{D1}$ between the control voltage $V_B$ and the first voltage $V_1$.

On the contrary, for moving the horizontal center of the raster to the right of the screen, the DC current of the horizontal deflection yoke Hy must be decreased by exhausting the DC current through the sixth resistor R16 and the choke coil Ly from the node A.

When exhausting the DC current from the horizontal deflection yoke Hy, the current output part 230 outputs the second current $I_2$. The second current $I_2$ is generated from the second output circuit 235 of the current output part 230. When the second current is increased, the first current $I_1$ is decreased. As the second current is increased, an intensity of the current being exhausted form the horizontal deflection yoke Hy is increased.

For increasing the second current $I_2$, the control voltage which is provided from the control part 250 to the current output part 230 must be increased. That is, since the second current $I_2$ is the collector current of the NPN transistor Q6, assuming that base currents of the second PNP and NPN transistors are zero, the second current $I_2$ can be expressed as follows:

$$I_2 = I_6 - I_7 \quad (3)$$

where $I_6$ denotes a current flowing through the seventh resistor R24, and $I_7$ denotes a current flowing through the second resistor R12.

And, in equation (3), when $I_7$ has a constant value, the second current $I_2$ is determined by the current $I_6$ flowing through the seventh resistor 24. Also, since a base-emitter voltage drop of the second PNP Q5 is compensated by a base-emitter voltage drop of the second NPN Q6, assuming that the base currents of the second NPN and PNP transistors Q6 and Q5 are zero, the voltage across the first resistor R23 is equal to the voltage difference between the first voltage $V_2$ and the control voltage $V_B$. Therefore, the current $I_6$ can be written as follows:

$$I_6 = \frac{V_{D2}}{R24} \quad (4)$$

where $V_{D2}=V_D-V_2$.

Therefore, as shown in equations (3) and (4), the second current $I_2$ is in proportion to the difference of voltage $V_{D2}$ between the control voltage $V_B$ and the first voltage $V_2$.

The control voltage $V_B$ of the node B is determined by the collector current of the third NPN transistor Q7. When the collector current of the third NPN transistor Q7 is increased, a voltage across the 14th resistor R9 of the voltage generation circuit 253 is increased, such that the control voltage $V_B$ of the node B is dropped. To the contrary, when the collector current of the third NPN transistor Q7 is decreased, the control voltage $V_B$ of the node B is increased.

The collector current of the third NPN transistor Q7 is controlled by an output voltage Vo of the Op-Amp 254. The output voltage Vo of the Op-Amp 254 is determined by an input voltage Vref between the inverting and noninverting terminals of the Op-Amp 254 and a resistor ratio of the 11th resistor R22 and 15-th resistor R19. Therefore, The output voltage Vo of the Op-Amp 254 is in porportion to a voltage of the center adjustment signal 2502.

Therefore, after the horizontal center of the raster is adjusted to the center of the monitor screen by varying the voltage of the center adjustment signal 2502, by fixing the voltage of the center adjustment signal 2502, achievement results to make a monitor generate the raster, the horizontal center of which is aligned with the center of the screen.

As illustrated above, the present invention provides a circuit which can align the horizontal center of a raster developed on a monitor screen with that of the monitor screen.

While the invention has been described in terms of a preferred embodiment, those skilled in the art will recognize that the invention can be practiced with modification within the spirit and scope of the appended claims.

What is claimed is:

1. A circuit for adjusting a horizontal center of a raster which is generated on a screen of a monitor, comprising:

first means for generating a first voltage and a second voltage, the first voltage having a higher potential than that of a B+ voltage which is applied to a horizontal deflection yoke of the monitor, the second voltage having a lower potential than that of the B+ voltage;

second means for generating a control voltage in response to a center adjustment signal which is provided from an exterior, said control voltage having a voltage between the first voltage and the second voltage; and third means for controlling an intensity of a direct current flowing through the horizontal deflection yoke based on the control voltage, the first voltage, and the second voltage, wherein said first means includes a transformer which has a primary coil driven with the horizontal deflection coil and generates an induced voltage at a secondary coil thereof, a first rectifier for rectifying the induced voltage to generate the first voltage, and a second rectifier for rectifying the induced voltage to generate the second voltage.

2. A circuit as claimed in claim 1, wherein said second means includes an amplifying circuit for amplifying the center adjustment signal to generate an amplified signal;

a current generating circuit for generating a current corresponding to the amplified signal; and a voltage generating circuit for generating the control voltage corresponding to the current inputted from the current generating circuit.

3. A circuit as claimed in claim 1, wherein said third means includes a first output circuit for generating a first current in response to the control voltage when the control voltage is higher than or equal to a reference voltage, and for providing the first current to the horizontal deflection yoke; and a second output circuit for generating a second current in response to the control voltage when the control voltage is lower than the reference voltage, and for providing the second current to the horizontal deflection yoke.

4. A circuit as claimed in claim 3, wherein said first output circuit is complimentarily operated with the second output circuit with respect to the control voltage.

5. A circuit as claimed in claim 3, wherein said first current corresponds to a voltage difference between the first voltage and the control voltage.

6. A circuit as claimed in claim 3, wherein said second current corresponds to a voltage difference between the second voltage and the control voltage.

7. A circuit as claimed in claim 3, wherein said first output circuit includes a first resistor, one terminal of which is connected with an output terminal of the first voltage;

- a first NPN transistor, a collector of which is connected with the other terminal of the first resistor;
- a first PNP transistor which has a base connected with an emitter of the first NPN transistor and an emitter connected with the collector of the first NPN transistor; and
- means for making a current outputted from the emitter of the first NPN transistor,
- wherein an intensity of the first current flowing through the collector of the first PNP transistor is determined by a voltage difference between a base voltage of the first NPN transistor and the first voltage.

8. A circuit as claimed in claim 3, wherein said second output circuit includes a second resistor, one terminal of which is connected with an output terminal of the second voltage;

- a second PNP transistor, a collector of which is connected with the other terminal of the second resistor;
- a second NPN transistor which has a base connected with an emitter of the second PNP transistor and an emitter connected with the collector of the second PNP transistor; and
- means for making a current inputted to the emitter of the second PNP transistor,
- wherein an intensity of the second current flowing through the collector of the second NPN transistor is determined by a voltage difference between a base voltage of the second PNP transistor and the second voltage.

* * * * *